United States Patent
Cheng et al.

(10) Patent No.: US 7,290,786 B2
(45) Date of Patent: Nov. 6, 2007

(54) PLACEMENT RACK ON BABY CART

(75) Inventors: Huang-Yi Cheng, Chia Yi Hsien (TW); Yung-Shuen Lin, Chia Yi Hsien (TW); Ho-Sheng Chen, Chia Yi Hsien (TW)

(73) Assignee: Link Treasure Limited, Tortola (VG)

( * ) Notice: Subject to any disclaimer, the term of this patent is extended or adjusted under 35 U.S.C. 154(b) by 298 days.

(21) Appl. No.: 11/042,460

(22) Filed: Jan. 25, 2005

(65) Prior Publication Data

US 2005/0161912 A1 Jul. 28, 2005

(30) Foreign Application Priority Data

Jan. 27, 2004 (TW) ............................. 93201257 U

(51) Int. Cl.
*B62B 7/06* (2006.01)
(52) U.S. Cl. .................. 280/647; 280/642; 224/409
(58) Field of Classification Search ................ 280/639, 280/38, 641, 642, 643, 644, 647, 648, 650, 280/657, 658, 47.38; 224/409, 411
See application file for complete search history.

(56) References Cited

U.S. PATENT DOCUMENTS

| 4,491,335 | A | * | 1/1985 | Evron ...................... 280/47.41 |
| 5,741,021 | A | * | 4/1998 | Saint et al. ............... 280/47.38 |
| 6,854,758 | B2 | * | 2/2005 | Hou et al. .................. 280/642 |
| 6,979,017 | B2 | * | 12/2005 | Chen ........................... 280/642 |
| 7,011,318 | B2 | * | 3/2006 | Chen ....................... 280/47.38 |
| 7,073,815 | B2 | * | 7/2006 | Espenshade et al. ........ 280/642 |

\* cited by examiner

*Primary Examiner*—Frank Vanaman
(74) *Attorney, Agent, or Firm*—Alan Kamrath; Kamrath & Associates P.A.

(57) ABSTRACT

A placement rack on baby cart, particularly for supporting a movable placement basket having a fastener member; installed on the baby cart frame is a fastener unit that can be engaged with the fastener member, so that they work together to support the placement basket. When placing a larger object, the user can pull on the placement basket support to disengage the fastener member from the fastener unit, so that the placement basket support can rotate downwards to increase the space to accommodate incoming articles.

6 Claims, 6 Drawing Sheets

PLACEMENT RACK ON BABY CART

BACKGROUND OF THE INVENTION

1. Field of the Invention

The present invention relates to a placement rack on a baby cart, to the effect to include a placement basket on the baby cart that is supported by a movable placement basket support, so that when the user pulls the placement basket support, the placement basket support is rotated downwards to increase a space to accommodate the entry of the incoming article.

2. Description of Prior Art

Parents use baby carts to carry their babies or young children when they go on an outdoor trip. For that purpose, they have to bring along necessary items for the care of babies. When parents are on a shopping trip, they would carry their purchases on the baby cart, in order to reduce their burdens. Therefore, the conventional baby cart is equipped with a placement basket to enable placing of baby items thereon.

As shown in FIG. 1, the conventional baby cart 1 comprises a frame 11 and a seat fabric 12, wherein the rear extension of the seat lever 13 on the frame 11 serves to support the placement basket 14, to facilitate the user to place the article in the basket 14.

As described above of the structure of conventional placement basket 14 for a baby cart 1, since the accommodating space of the placement basket 14 is normally disposed under the seat, and the placement basket 14 is supported by an extended tube fixed onto the unit, resulting in inconvenience because of the limited space (the range marked 'a' in the figure) when the user is trying to place articles therein, when the back tube 15 on the baby cart frame 11 is inclined.

SUMMARY OF THE INVENTION

Therefore, with a view to make improvement on the shortcoming in placing articles in the structure of the prior art because of its fixed type of extension section serving to support the placement basket, the present invention, characterized in that, a movable placement basket support having a fastener member is installed on a lower side of the frame of a baby cart, to support a placement basket. The baby cart frame has a fastener unit that is fastened with a fastener member on the placement basket support, to support the placement basket. To place an article therein, the user pulls on the placement basket support, to disengage the fastener member from the fastener unit, so that the placement basket support is turned downwards to form an increased space to accommodate the entry of the article, thereby the user can place a larger object into the placement basket on the baby cart.

BRIEF DESCRIPTION OF THE DRAWINGS

In order that the present invention may more readily be understood, the following description is given, merely by way of example with reference to the accompanying drawings, in which.

DETAILED DESCRIPTION OF THE PREFERRED EMBODIMENT

Figure 1:
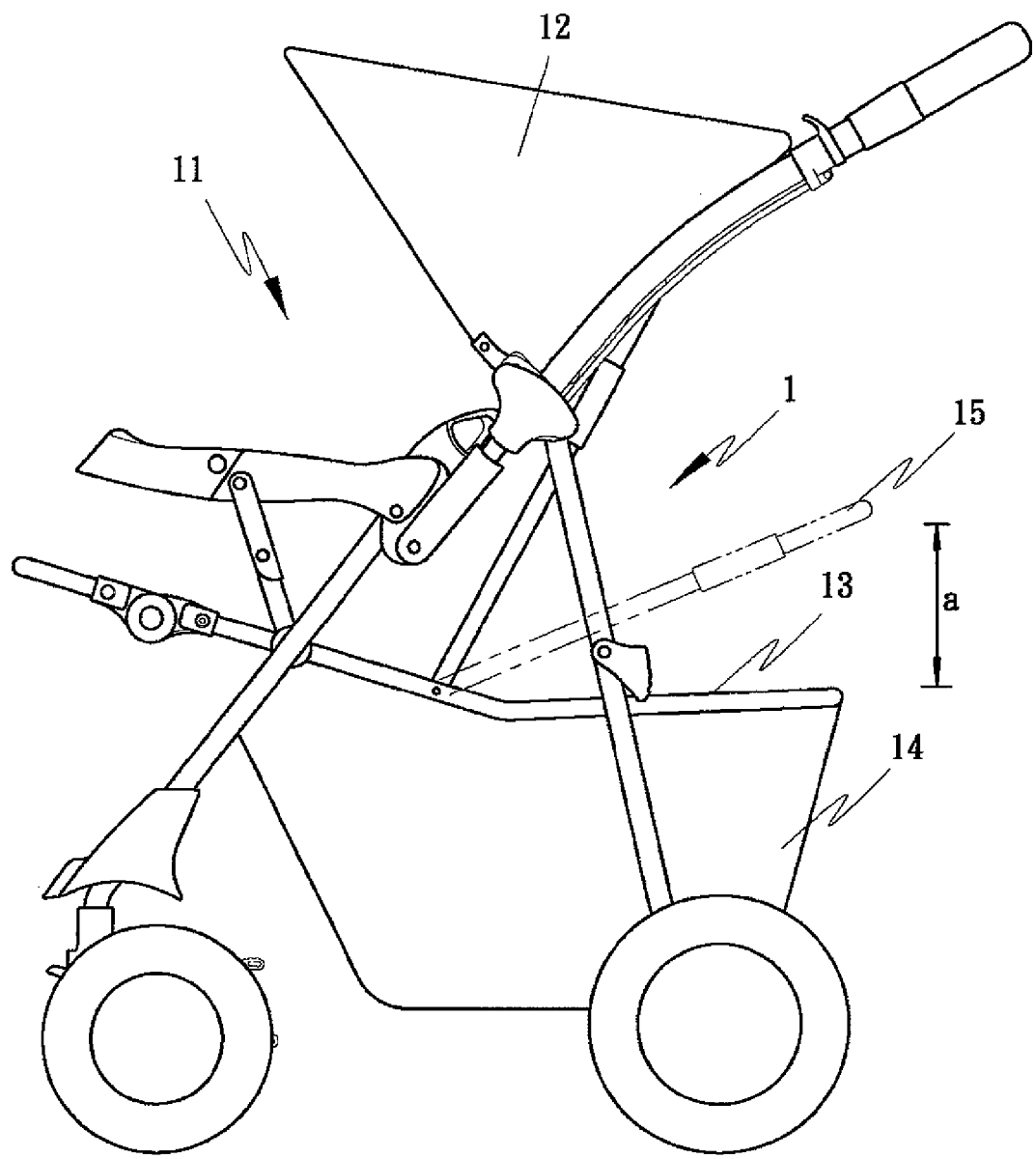
FIG. 1 is a schematic view of a prior art.
Figure 2:
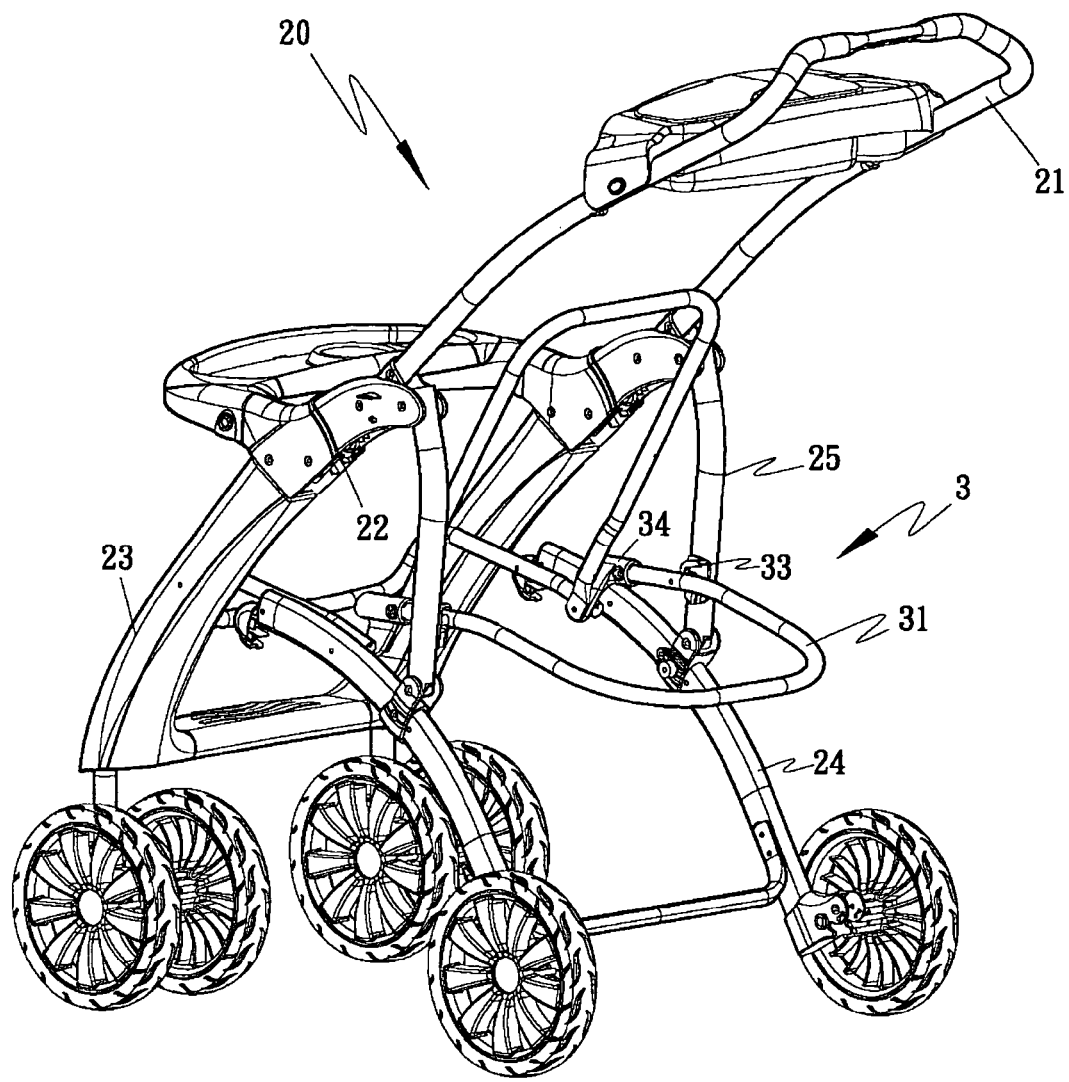
FIG. 2 is a perspective view of the present invention of placement rack.
Figure 3:
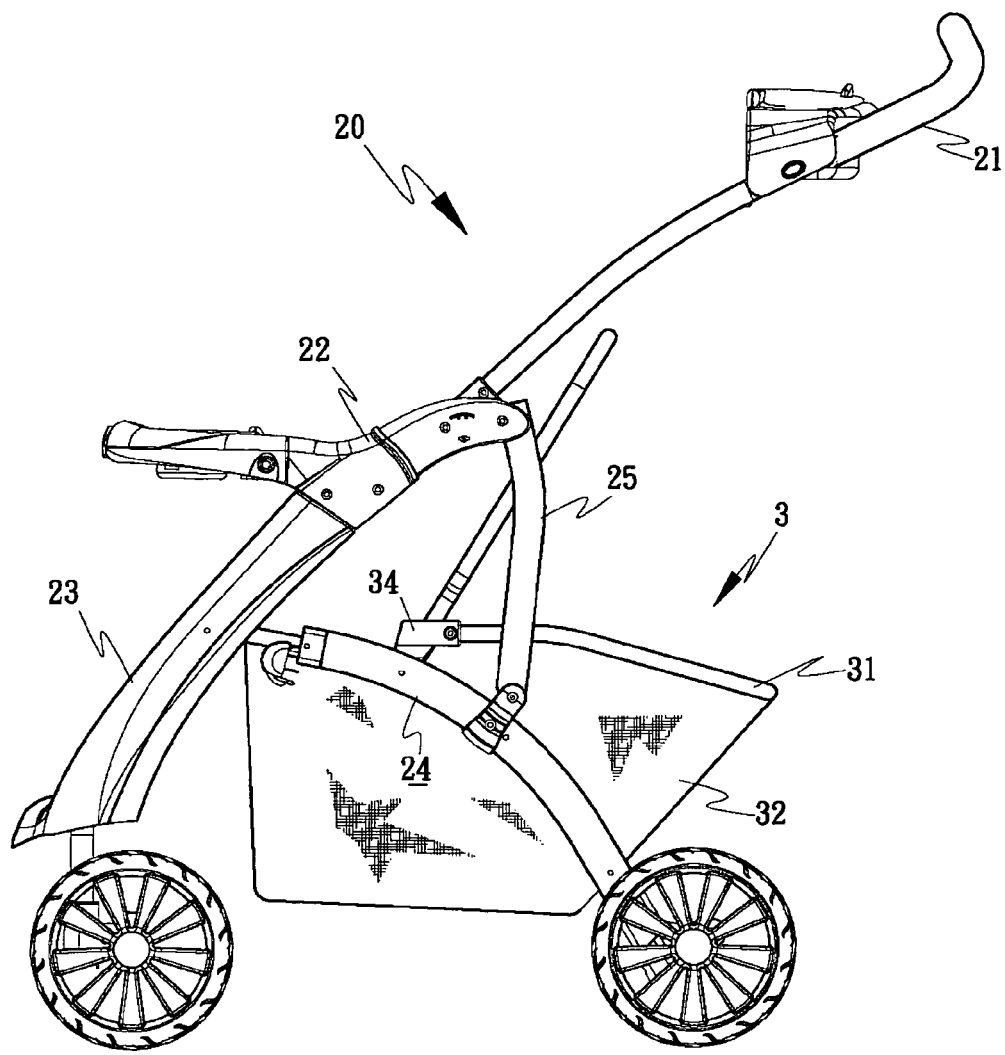
FIG. 3 is a side view of the invention of placement rack.

As shown in FIGS. 2 and 3, the present invention relates to a placement rack on a baby cart, installed on a frame of the baby cart, including: a baby cart frame 20, consisting of handle bars 21, joint units 2, front leg tubes 23, rear leg tubes 24 and support tubes 25. The baby cart frame 20 is controlled by the joint units 22, so that the baby cart frame 20 can be extended for use in a usage status and can be folded by collapsing tube members in a folded status.

Figure 4:
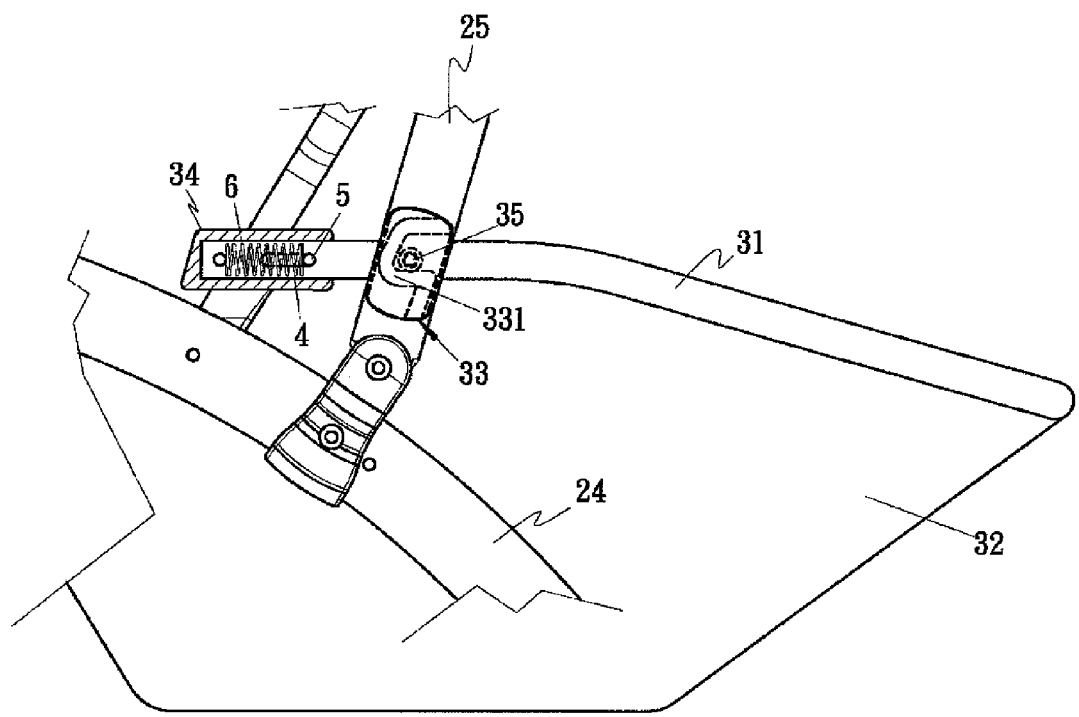
FIG. 4 is a schematic view of part of the invention of placement rack.

FIG. 4 shows a placement basket structure 3, including a placement basket support 31, a placement basket 32 and a fastener unit 33. The placement basket support 31 is joined with a rotator unit 34, and the rotator unit 34 is hinged onto the rear leg tubes 24. The placement basket support 31 further includes an elongated hole 4. The elongated hole 4 is penetrated and by a rivet 5 and joined to the rotator unit 34, permitting the placement basket support 31 to move within the scope of the elongated hole 4. On two sides of the placement basket support 31 is installed a fastener member 35 capable of moving along with the placement basket support 31.

The fastener unit 33 is joined and secured to support tubes 25 on the baby cart frame 20. The fastener unit 33 has a fastener part 331 disposed opposite the fastener member 35, the fastener part 331 serving to support the fastener member 35. Installed inside the placement basket support 31 is a flexible member 6. The flexible member 6 uses its flexibility to hold the fastener member 35 inside the fastener part 331, thereby the placement basket support 31 is capable of supporting the placement basket 32.

Figure 5:
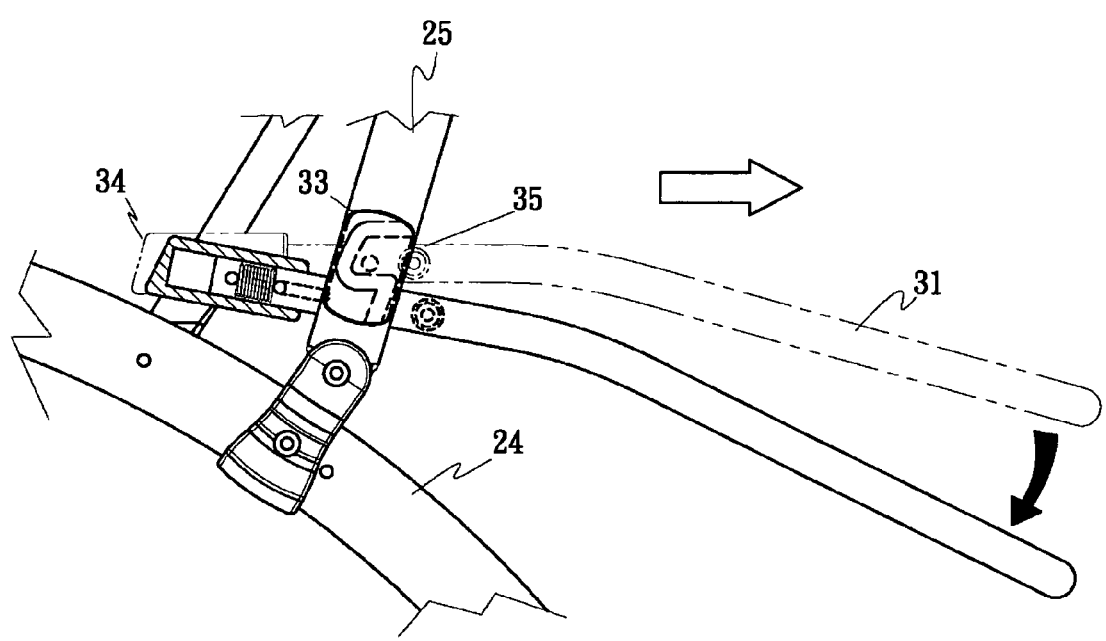
FIG. 5 is a schematic view of part of the invention of placement rack in operation.
Figure 6:
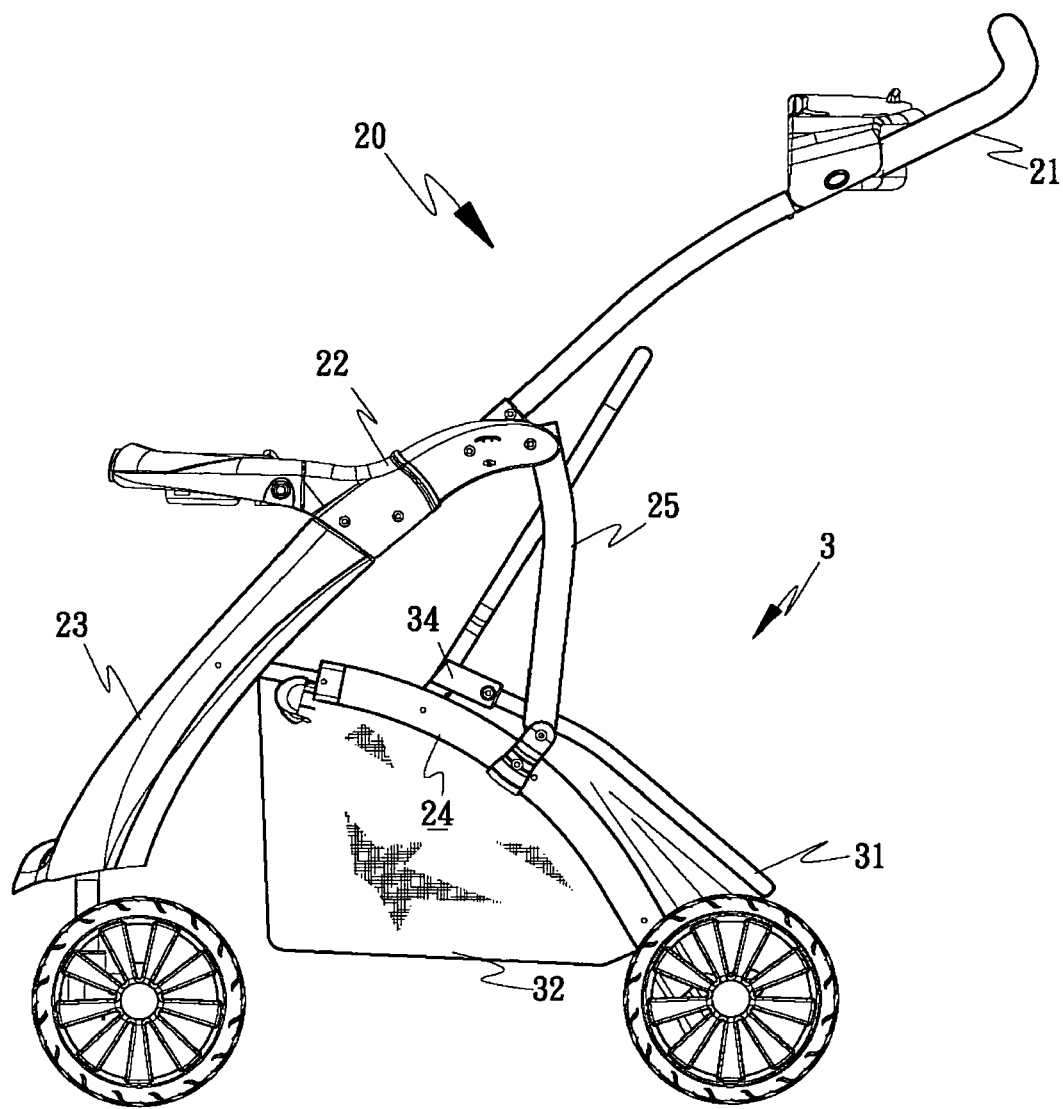
FIG. 6 is a schematic view of the invention of placement rack in operation.

As shown in FIGS. 5 and 6, when a user wishes to place articles in the placement basket 32, the user disengages the fastener member 35 from the fastener unit 33 by directly pulling the placement basket support 31, thereby permitting the placement basket support 31 to move downwards and increase the space accommodating the article. Thus, the user can enjoy the convenience when placing articles therein.

What is claimed is:

1. A placement rack on a baby cart, comprising:
   a fastener unit having a length, with the fastener unit having at least one cavity within the length, with the fastener unit fixed and joined to a frame of the baby cart;
   a rotator unit hinged to the frame of the baby cart about a hinge axis; and
   a placement basket support supporting a placement basket, with the placement basket support slideably mounted to the rotator unit, with the placement basket support having a fastener member to move and selectively engage and disengage from the cavity of the fastener unit, with the placement basket support intersecting the fastener unit and pivotable about the hinge axis within the length of the fastener unit between an upright condition and a downward condition, with the placement basket support being slideable between a retracted position and an extended position, with the fastener member received in the cavity in the retracted position and the upright condition, with the placement basket support being pivotal about the hinge axis between the upright condition and downward condition in the extended position, to permit rotating with the rotator unit about the hinge axis to intersect the fastener unit within the length and for radial extension and movement, wherein the placement basket support is pivotable about the hinge axis relative to the fastener unit with the placement basket support and also being slideable relative to the rotator unit to position the fastener member within the cavity of the fastening unit, wherein the placement basket support is capable of remaining engaged with or disengaging from the fastener unit.

2. The placement rack on the baby cart of claim 1, wherein the placement basket support further includes an elongated hole, permitting radial movement of the placement basket support within the scope of the elongated hole, after the placement basket support is joined with the rotator unit.

3. The placement rack on the baby cart of claim 1, wherein, the placement basket support further includes a flexible member, the flexible member serving to maintain engagement of the fastener member to the fastener unit.

4. The placement rack on the baby cart of claim 1, wherein the frame of the baby cart includes handle bars connecting joint units, front leg tubes, rear leg tubes and support tubes; by locking and unlocking the joint units, the frame of the baby cart is capable of moving between an extended status and a folded status.

5. The placement rack on the baby cart of claim 1, wherein the fastener unit is joined and secured onto support tubes on the frame of the baby cart.

6. The placement rack on the baby cart of claim 1, wherein the rotator unit is hinged to rear leg tubes on the frame of the baby cart.

* * * * *